United States Patent [19]

Richards

[11] 4,028,441

[45] June 7, 1977

[54] LIQUID LEVEL CONTROL SYSTEM AND CARBONATOR

[75] Inventor: George B. Richards, Lake Forest, Ill.

[73] Assignee: Fluid Device Corporation, Highland Park, Ill.

[22] Filed: Sept. 5, 1975

[21] Appl. No.: 610,846

Related U.S. Application Data

[60] Continuation of Ser. No. 345,907, March 29, 1973, abandoned, which is a division of Ser. No. 840,119, June 19, 1969, Pat. No. 3,730,500, which is a continuation-in-part of Ser. No. 724,385, April 26, 1968, abandoned.

[52] U.S. Cl. .............................. 261/36 R; 62/307; 222/318; 261/140 R; 261/151; 261/DIG. 7
[51] Int. Cl.² .......................................... B01F 3/04
[58] Field of Search ............ 261/36 R, 140 R, 151, 261/DIG. 7; 222/318, 424; 137/115; 62/306, 307, 398, 399, 201; 165/154

[56] References Cited

UNITED STATES PATENTS

| | | | |
|---|---|---|---|
| 2,497,741 | 2/1950 | Quimper | 261/DIG. 7 |
| 2,503,376 | 4/1950 | Burgess | 261/DIG. 7 |
| 2,519,533 | 8/1950 | Arnett | 261/DIG. 7 |
| 2,531,315 | 11/1950 | Wyllie, Jr. | 62/201 X |
| 3,211,331 | 10/1965 | Marisic et al. | 261/DIG. 7 |
| 3,259,273 | 7/1966 | Kromer | 261/DIG. 7 |
| 3,313,093 | 4/1967 | Guggenberger et al. | 261/DIG. 7 |
| 3,370,755 | 2/1968 | Querner | 261/DIG. 7 |
| 3,479,839 | 11/1969 | Scott | 62/399 X |
| 3,730,500 | 5/1973 | Richards | 261/DIG. 7 |

Primary Examiner—Tim R. Miles
Assistant Examiner—Richard L. Chiesa
Attorney, Agent, or Firm—Hosier, Niro & Daleiden, Ltd.

[57] ABSTRACT

A flow regulator is disclosed for controlling liquid flow, for example, from a supply source to a receiving tank according to the liquid level in the tank. Specifically, a fluid interaction device communicating with the receiving tank causes a fluid pressure signal to be developed in response to departure of the liquid in the tank from a predetermined level. A differential pressure responsive valve adjusts liquid flow from the supply source to the receiving tank in response to the fluid pressure signal. Several embodiments and other features including a bypass for enhancing stable flow and a preferred valve structure are disclosed.

A beverage dispensing system incorporating the aforesaid flow regulator is also disclosed. A cold carbonated liquid is continually circulated past dispensers from a pressurized chill tank having a carbon dioxide atmosphere. The flow regulator admits further liquid to the system from a supply source whenever liquid is tapped from the system by the dispensers.

5 Claims, 6 Drawing Figures

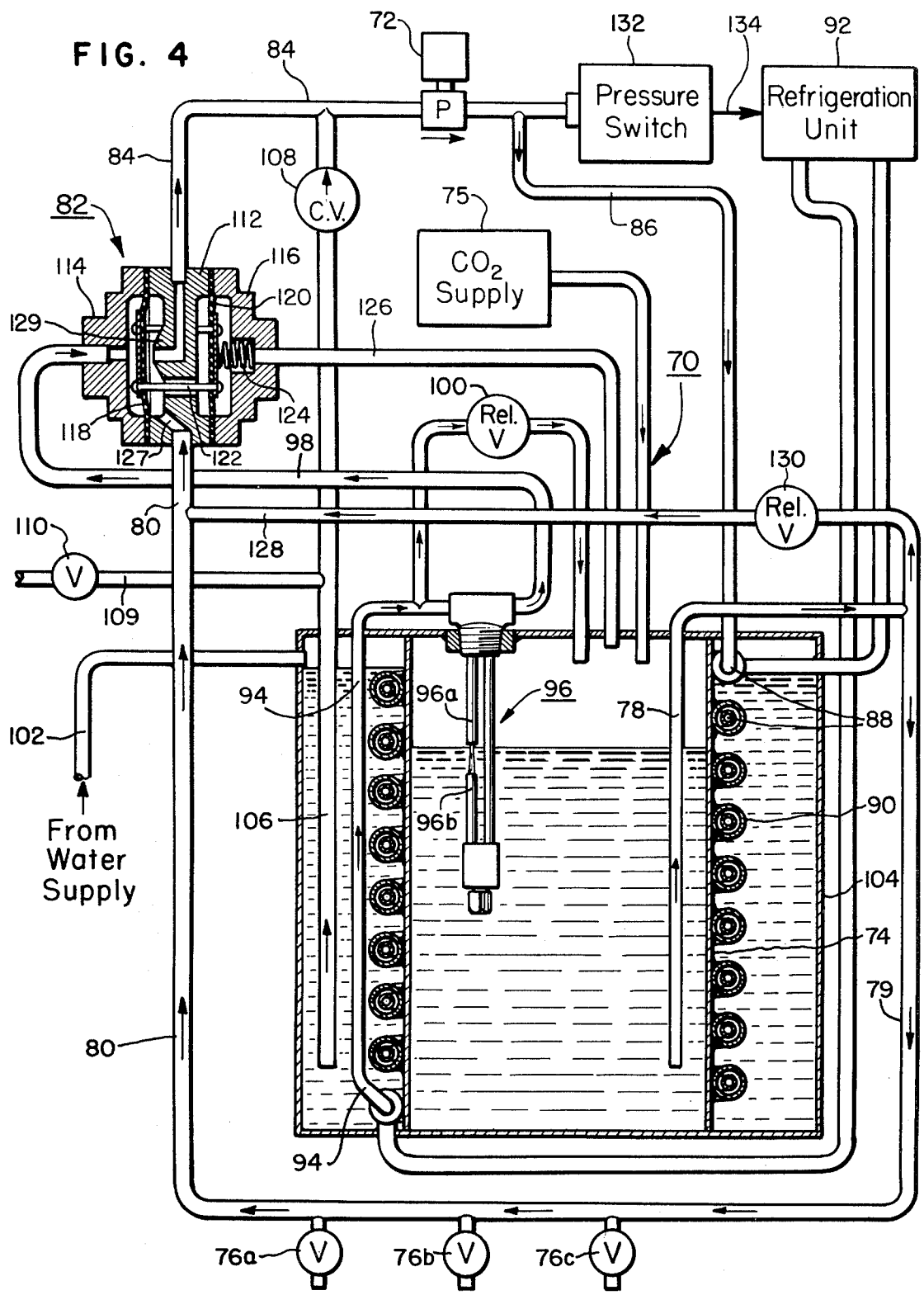

LIQUID LEVEL CONTROL SYSTEM AND CARBONATOR

CROSS-REFERENCE TO RELATED APPLICATIONS

This is a continuation of application Ser. No. 345,907, filed Mar. 29, 1973, now abandoned, which is a division of copending application Ser. No. 840,119, filed June 19, 1969 now U.S. Pat. No. 3,730,500, which in turn is a continuation-in-part of application Ser. No. 724,385, filed Apr. 26, 1968, now abandoned.

INTRODUCTION

The invention relates generally to liquid flow control or regulator system, valve devices useful therein and to combination flow regulator-carbonators. More particularly, the invention is directed in one aspect to systems for automatically adjusting the rate of liquid flow from a supply source to a receiving reservoir or tank in accordance with the sensed liquid level within the tank. A more specific aspect of the invention is directed to an integral flow regulator-carbonator useful, for example, in a carbonated beverage dispensing system to maintain a desired liquid reserve in a chilling tank and to concomitantly carbonate the chilled liquid.

For convenience, the flow control arrangements and the valve device of the invention are illustrated only in the context of the beverage dispensing system, although those skilled in the art will recognize their more general utility.

SUMMARY OF THE INVENTION

The liquid flow control system of the invention automatically adjusts the rate of liquid flow from a supply source to a receiving reservoir from a first to a second preselected value whenever the liquid within the reservoir falls below or rises above a single predetermined sensing level. The sensing apparatus per se employs no moving parts and the complete system only utilizes one moving part, namely, a pressure sensitive valve. No electrical components are employed. The system is therefore characterized by a low initial cost and highly reliable, maintenance-free operation.

A wide range of flow control characteristics are possible such as, for example, a transition from a low to high flow rate upon lifting of the reservoir to a critical level. A flow characteristic of this type is important, for instance, in an antistatic loading system for highly volatile liquids, such as aviation fuels or the like. Conversely, the system may transfer from a high to a low flow rate at the selected liquid level to permit topping off of chemical tanks without excessive foaming, etc. On the other hand, simple on-off operation is also possible thereby to assure that a constant volume of liquid is retained in the tank at all times. In all of the described modes of operation, the flow control system is acutely sensitive providing an abrupt signal transition at the preselected sensing level; pressure sensitive valves of varying types may be employed to provide a wide range of responses to the signal.

In the context of a beverage dispensing system, the flow control arrangement of the invention sustains a preassigned liquid level in a chilling tank by enabling a supply source to add liquid to the chilling tank whenever there is even a slight reduction in liquid level due to operation of one or more of the beverage dispensers. Accordingly, the liquid is maintained at a more uniform, cold temperature to provide a superior beverage to that of typical prior art systems wherein the reservoir is not refilled until a substantial reduction in volume occurs. This constant volume feature also obviates any requirement for sophisticated pressure regulating apparatus as is needed in certain prior art systems to maintain a reasonably uniform $CO_2$ pressure with material variations of the liquid volume in the chill tank. Of course, significant changes in the $CO_2$ pressure are intolerable as they result in the delivery of varying soda volumes with a fixed syrup volume causing noticeable differences in the taste and quality of the dispensed drinks.

The liquid level or flow control system of the invention comprises reservoir means having an inlet and an outlet and adapted for receiving a quantity of liquid therein. Flow control means including a pressure responsive element are provided for regulating flow at either or both of the inlet and outlet of the reservoir according to a sensed pressure condition. A fluid amplifier means, having serially aligned inlet, interaction and outlet zones includes an inlet flow channel positioned above the desired liquid sensing level in the reservoir with the terminus of the flow channel approximately contiguous the sensing level and oriented for directing a liquid flow transversely to the surface of the liquid in the reservoir. The fluid amplifier further includes outlet means separated from the inlet flow channel by the free space of the interaction region and coupled to the flow control means. In operation, the liquid from the inlet flow channel impinges on the outlet means with a first predetermined pressure when the level in the reservoir is below the sensing level and a second, substantially lesser value when the liquid in the reservoir moves to the sensing level thereby actuating the flow control means.

In accordance with the invention, a beverage dispensing system the type having a recirculating flow path with a valve means for interrupting the recirculation path and adding liquid to the system from a supply source to replenish that tapped from the system comprises a conduit means included within the recirculation flow path and extending from the chill tank for a predetermined long distance to the dispenser means and returning to the inlet side of the valve means. A bypass means, including a flow conduit of a substantially shorter length than the conduit means coupled between a portion of the conduit means adjacent the chill tank and the inlet side of the valve means, is provided for communicating an adequate supply of liquid to the liquid pump to preclude pump cavitation and also for contributing an ancillary flow path to the dispensers through the flow conduit and the conduit means.

In accordance with another facet of the invention, the beverage dispensing system of the type above described further includes refrigeration means comprising a refrigeration coil helically wound about the chill tank. Conduit means are coupled in the return flow portion of the recirculation flow path between the dispenser means and the chill tank. Specifically, the conduit means comprises a helical coil centrally supported within the helical refrigeration coil for rapidly recooling the circulating liquid prior to reintroduction into the chill tank. A tempering tank means surrounds the chill tank and defines therewith an annular liquid reservoir for precooling liquid by contact with helical refrigeration coils prior to introduction into the recirculation flow path, the tempering tank means having an inlet coupled to the supply source and an outlet coupled to the recirculation means.

In accordance with a further feature of the invention, the flow regulator is provided with a preferred form of pressure responsive valve, the valve having utility in a variety of other contexts. Specifically, the valve comprises shiftable closure means including a pair of spaced, moveable diaphragm members associated for coordinated movement between a pair of spaced positions. Valve body means cooperate with respective ones of the diaphragm members to define first and second signal pressure sensing cavities and cooperate with both of the diaphragm members to define a third valve cavity. First and second pressure signal inlet conduits are provided for communicating with the first and second cavity, respectively, in order to displace the associated diaphragm members between the spaced positions in accordance with the relative signal pressures introduced into the first and second cavities. Main flow conduit means comprising an inlet flow conduit communicates with the third valve cavity when the associated diaphragm members are in either of the spaced positions. An outlet flow conduit communicating with the third cavity and having a valve seat portion spaced from one of the associated diaphragm members when said associated diaphragm members are in one of the spaced positions is provided to permit flow between inlet and outlet conduits. The aforesaid one diaphragm member engages the valve seat portion of outlet flow conduit upon movement of associated diaphragm members to the other of the spaced positions to close the outlet and block flow between the inlet and outlet conduits.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

FIG. 4 is a semi-schematic illustration of a preferred embodiment of the beverage dispensing system of the invention which also embodies a liquid level sensing device and other features according to the present invention;

DESCRIPTION OF THE PREFERRED EMBODIMENTS

Figure 1:
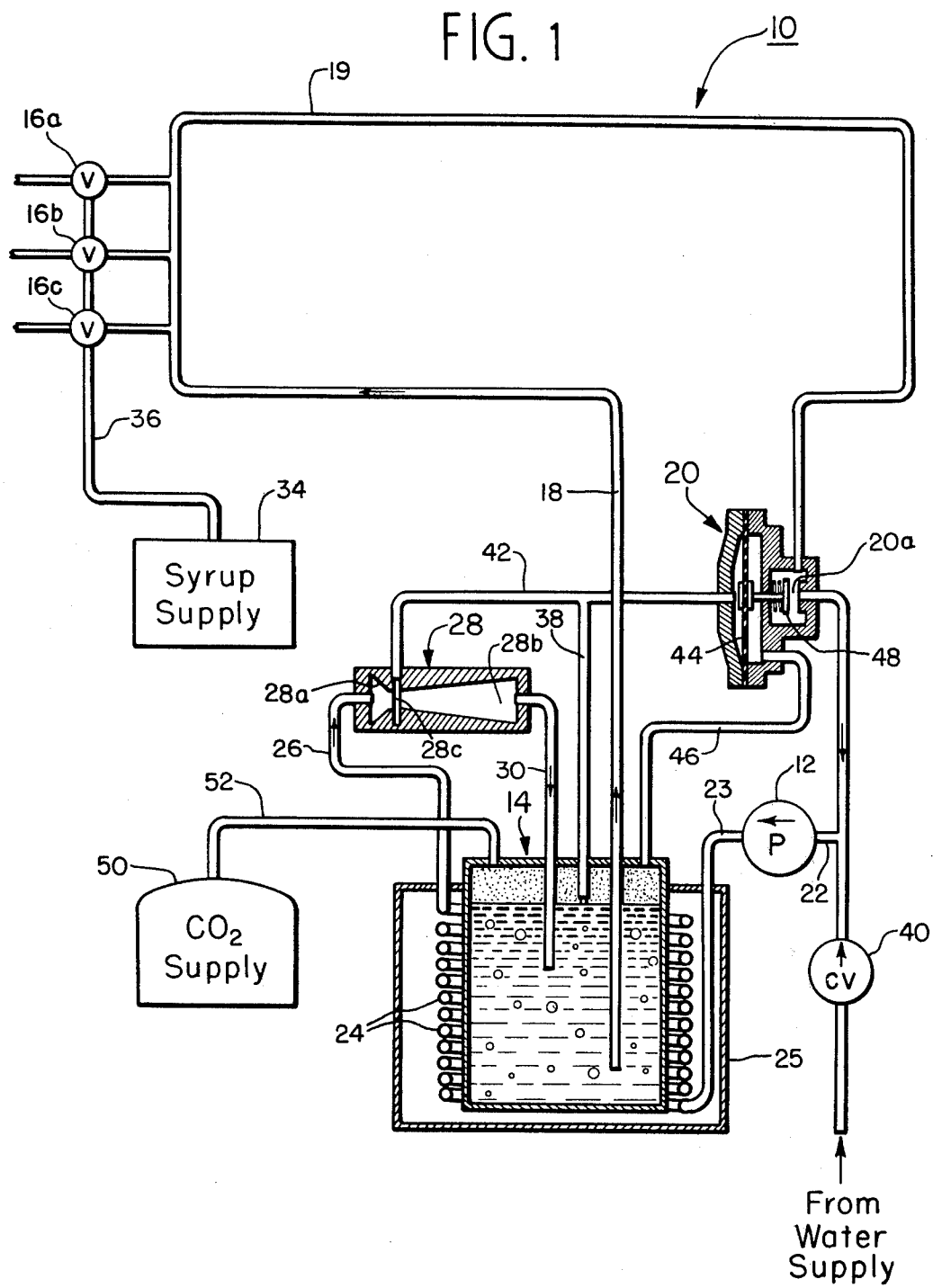
FIG. 1 is a semi-schematic illustration of an embodiment of the fluid flow control apparatus of the invention as utilized in a beverage dispensing system likewise constructed in accordance with the teachings of the present invention.

Referring now to FIG. 1, there is illustrated a soft drink beverage dispensing system generally designated by the reference numeral 10. The system 10 comprises a conventional liquid pump 12 and a recirculation means to continuously provide a flow of a cold, freshly carbonated liquid from a receiving vessel or chill tank 14 past a series of dispensing heads 16a–16c. Thus, a cold and suitably carbonated beverage is immediately available from each of the discharge spigots (not shown) of the respective dispensing leads.

More specifically, the recirculation means includes an outlet conduit 18 for the chill tank 4 connected in shunt to the dispensing heads 16a–16c, the dispensers together being arranged in a conventional fountain array. A return flow path is provided through a conduit 19, a differential pressure responsive valve device 20, and a conduit 22 to the input side of the pump 12. The output of pump 12 is coupled by conduit 23 of the lower end of a spiraled cooling coil 24 that is wrapped about the receiving tank 14. Refrigeration coils (not shown) are interwound in intimate contact with the cooling coil 24 to provide a rapid initial cooling of the supply liquid introduced into the recirculation system. An insulative cladding 25 encloses the tank 14 as well as the cooling and refrigeration coils.

The upper end of the spiral coil 24 is connected by conduit 26 to an inlet portion 28a of a fluid interaction means 28. In the present embodiment, means 28 is a conventional Venturi tube although as will be explained later herein, a variety of other similar devices are also suitable. An outlet portion 28b of the Venturi is connected by a discharge conduit 30 to the reservoir 14 to complete the return flow path of the recirculation means.

In making a carbonated drink one of the dispensing heads 16a–16c is opened to tap a portion of the carbonated liquid from the recirculation system. Assuming that a premixture of a flavoring syrup has not been made with the circulating liquid, it is conventional to introduce an appropriate amount of the syrup into the carbonated liquid at the dispensing head. To this end, there is provided a pressurized syrup supply 34 coupled by a conduit 36 to each of the dispensing heads 16a–16c. Actuation of one of the dispensers causes a measured amount of syrup to be introduced through an appropriate gating valve into the carbonated water as the water is discharged from the dispenser. In practice, several syrup supplies may be coupled to respective ones of the dispensing heads to allow selective dispensing of a variety of different drinks from one fountain array.

Removal of liquid from the system through one of the dispensers proportionately reduces the level of liquid in the chill tank 14. In accordance with the present invention, the liquid level within the tank 14 is restored or, more accurately, is maintained substantially constant irrespective of operation of the dispensers by a flow control system that involves the cooperative operation of the Venturi 28, a dip tube means 38, the pressure responsive valve device 20 and a liquid supply source (not shown). The supply source is connected to the closed loop flow path of the recirculation means at a point intermediate the valve device 20 and the input side of pump 12 by a normally closed check valve 40.

The upper end of the dip tube 38 connects to a transverse conduit 42 that has one end joined to the control inlet portion 28c of the Venturi 28 and an opposite end coupled to the differential pressure responsive valve device 20. The lower end of the dip tube 38 terminates in a restrictive orifice positioned at a predetermined level in the tank 14 corresponding to the desired level of liquid to be maintained therein.

As will presently be explained in greater detail, a suction exists in the vicinity of the control inlet portion 28c resulting in a partial vacuum in the conduit 42 whenever the lower end of the dip tube 38 is covered. This partial vacuum results in the pressure sensitive valve device 20 remaining open. On the other hand, if the liquid level falls below that of the restrictive orifice of the dip tube 38, the partial vacuum is satisfied by the pressurized $CO_2$ gas within the tank 14 and the valve 20 is closed. In this latter case, the pump 12 draws its prime from the supply source (not shown through the check valve 40 which is now opened under the influence of the pump 12. When an amount of liquid comparable to that withdrawn through the dispenser enters the system, the restrictive orifice of the dip tube is again blocked or covered by the liquid in the tank and the system returns to the equilibrium condition outlined above.

Figure 2:
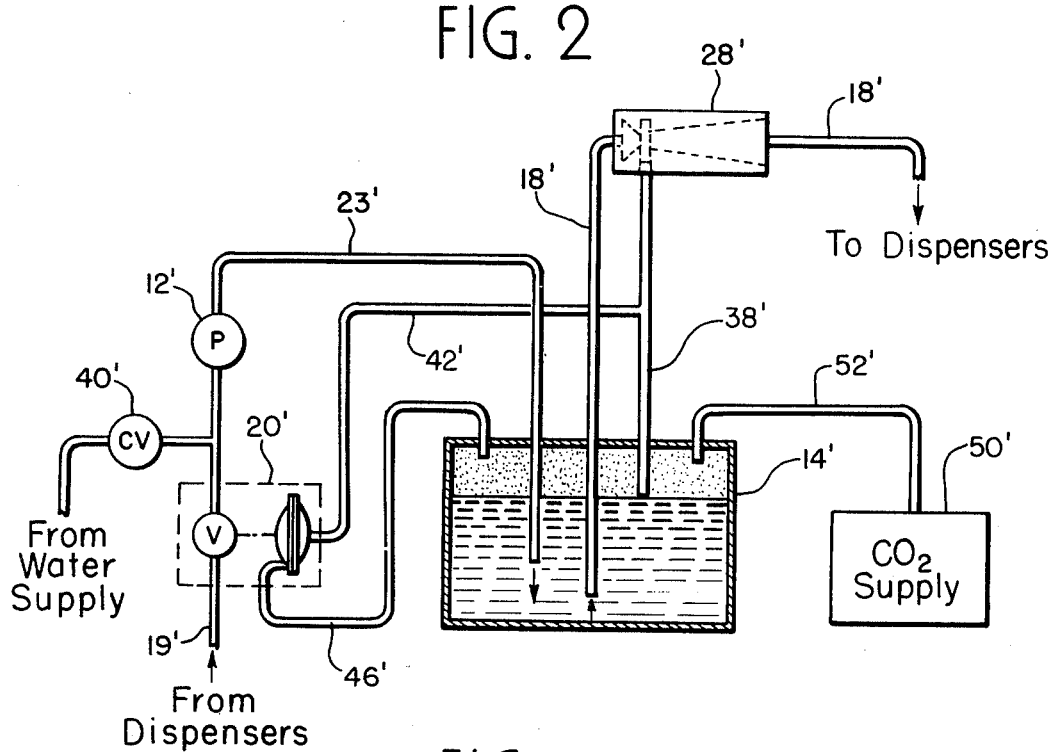
FIG. 2 is a partial schematic illustration of an alternate embodiment of the beverage dispensing system.

The fluid interaction means 28 may generally be any one of a broad class of devices having an inlet portion and an outlet portion for accommodating fluid flow therebetween and having an intermediate region with a control inlet portion. The fluid interaction means must also satisfy the additional criteria of being constructed and arranged such that closure of the control inlet portion develops a predetermined change in fluid pressure in the vicinity of at least one of the inlet, outlet or control inlet portions. Typically, most if not all fluid amplifiers are satisfactory, and a Coanda wall-attachment type fluid amplifier is illustrated in connection with the embodiment of FIG. 3. However, the Venturi type device illustrated in FIGS. 1 and 2 is presently preferred because of its simplicity and because of the comparatively low pressure drop or loss across the Venturi.

As is well known in the art, the Venturi 28 comprises a sharply converging conical inlet portion 28a followed by a gradually diverging conical outlet portion 28b. In the intermediate throat region defining the transition between the oppositely contoured inlet and outlet portions, the liquid moves at its maximum velocity and, accordingly, the fluid pressure in the intermediate throat region is substantially less than that at either ther Venturi inlet or the outlet. This reduced pressure condition in the region of the control inlet 28c in combination with the inherent tendency of the flowing liquid to entrain adjacent gas molecules causes a suction to be created in the vicinity of the control inlet portion 28c thereby developing a low pressure condition along the full length of the conduit 42, assuming the dip tube 38 to be closed. On the other hand, the pressure gradient is confined to the vicinity of the control inlet if the lower end of the dip tube 38 is open, i.e., the pressure within conduit 42 is equal to that of the tank 14.

The differential pressure responsive valve device 20 illustrated in the drawing is of the conventional diaphragm type although any other similar device, such as a conventional spool valve is equally suitable. The valve 20 comprises a pair of main housing members with mated annular flanges positioned to secure a valve operating member or diaphragm 44 in clamped relation therebetween. The diaphragm 44 partitions the volume enclosed by the mated housing sections into two physically separate zones. A first surface portion of the diaphragm 44 faces the zone to which the conduit 42 connects; the opposed or second surface of the diaphragm 44 faces the zone to which a conduit 46 is connected. The conduit 46 extends from the tank 14 to apply a predetermined reference pressure corresponding to the positive pressure within closed tank 14 to the second surface portion of the diaphragm 44. As is well understood in the art, the diaphragm 44 is laterally shiftable to the left or the right depending on the relative pressure differential between its opposed surfaces. A valve member 48 is rigidly affixed to the diaphragm 44 and is laterally shiftable in correspondence therewith relative to an associated annular valve seat to respectively open and close the valve passageway 20a. The valve member is spring biased to normally maintain the valve closed.

The beverage dispensing system of the present invention also includes a carbonating means comprising a carbon dioxide supply source 50 coupled to the receiving vessel 14 by a conduit 52. It is well known that a liquid more readily absorbs and retains a gas such as carbon dioxide if the carbonated liquid is maintained under a relatively high pressure. For this reason, it is preferred that the entire dispensing system be maintained under a positive pressure relative to the atmosphere and to this end the chill tank 14 is sealed to define an enclosed pressurized space.

According to the present invention, the carbonation of the liquid is effected without the provision of sprayers, liquid agitators, etc.; on the contrary, it is preferred that the surface condition of the liquid within the chill tank 14 not be excessively disturbed so as to impair proper operation of the dip tube 38 and for this reason the flow conduits 18 and 30 preferably extend a considerable distance below the surface of the liquid.

Although incidental carbonation may occur within the chill tank 14, the primary purpose of the tank 4 is to maintain a cold reserve of liquid for the dispensing system. The primary carbonation function is accomplished within the fluid interaction means 28. In this regard, it has been observed that even when the lower end of the dip tube 38 is in contact with the liquid surface causing a low pressure condition to exist in the dip tube 38 and the connecting conduit 42, an appreciable amount of carbon dioxide and water droplets are drawn through the dip tube 38 and are discharged into the flowing liquid stream at the control inlet portion 28c of the Venturi 28. To enhance the liquid-gas intermixture, i.e., fluid interaction, in the Venturi, the control inlet portion 28c is preferably formed to define a continuous annular inlet about the flowing stream.

A desired volumes scale rating of carbonation on the order of four, seven or more may reliably be attained in accordance with the system of the present invention by appropriate selection of the pressure for the carbon dioxide supply, the Venturi operating characteristics, and the like as will now be well understood by those skilled in the art.

In briefly summarizing the overall operation of the beverage dispensing system 10, it is initially assumed that the system is in an equilibrium condition with the lower end of the dip tube 38 contiguous the surface of the liquid to communicate a predetermined low pressure to the left side of diaphragm 44 relative to the reference pressure on the opposite side of the diaphragm thereby biasing the valve 48 to the left to maintain the valve passageway 20a open, all as illustrated in the drawing. Under the assumed conditions, the chilled, carbonated liquid is continually circulated by the pump 12 in the closed loop flow path previously described and denoted schematically by the arrows in the drawing. With the passageway 20a open, an insufficient pressure differential exists across the double check valve 40 to open this valve. Hence, no water is introduced into the circulating flow path from the supply source (not shown).

The circulating fluid also passes through the Venturi 28 and in so doing the liquid first increases and then decreases in velocity with the maximum velocity being reached in the narrowed throat region adjacent the control inlet portion 28c. Thus a low pressure relative to the Venturi inlet and oulet pressures prevails in the vicinity of the control inlet, all as is well understood in the art. A suction is therefore continually drawn in the dip tube 38.

As previously explained, the sensitivity of the flow control system in such that the lower end of the dip tube 38 is never fully submerged to totally block the dip tube but rather remains approximately contiguous the liquid surface. It has been found that the suction developed at the control inlet portion 28c of the Venturi causes carbon dioxide and water droplets to be drawn into the orifice of the dip tube 38 and injected into the flowing stream through the control inlet portion 28c of the Venturi 28. By volume, it is believed that about 50% water and 50% carbon dioxide are drawn into the dip tube 38 and intermixed with the circulating stream through the control inlet portion 28c of Venturi 28. Hence, the circulating liquid is contirually carbonated by the action of the Venturi 28 and the dip tube 38. Of course, the dip tube 38 may also be preferred to admit additional carbon dioxide if desired as long as a sufficient pressure differential is still developed by opening and closing of the dip tube to operate the pressure sensitive valve 20.

In one satisfactorily operated embodiment of the invention, the pressure of the carbon dioxide within the closed tank 14 was on the order of 80 lbs. per square inch. The water pressure at the inlet portion 28a of the Venturi 28 is approximately of a like amount. The pressure at the control inlet 28c is on the order of 65 lbs. per square inch and this reduced pressure is coupled to the first surface portion of the diaphragm 44 through the conduit 42, if the dip tube is closed. An 80 lb. per square inch pressure is communicated to the opposite surface of the diaphragm 44 through the conduit 46. This pressure differential is sufficient to overcome the spring bias of the valve 48 and maintain the passageway 20a in an open condition.

Assuming now that it is desired to make a cold drink, one of the dispensing heads 16a–16c is actuated to tap a selected amount of liquid from the closed flow path. An appropriate amount of syrup from the supply 34 is intermixed in the dispensing head with the carbonated liquid to complete the drink. Of course, if desired the syrup may be separately mixed after dispensing of the carbonating liquid.

Tapping of liquid from the closed loop flow path almost immediately causes a corresponding reduction in the level of liquid in the chill tank 14 thereby fully exposing the lower end of the dip tube 38 to the high pressure carbon dioxide atmosphere within the tank. The pressure in the dip tube 38 and the connecting conduit 42 is raised from about 65 lbs. per square inch to approximately 80 lbs. per square inch, according to the cited example, thereby relieving the negative pressure differential on the valve diaphragm 44. The valve head 48 now firmly engages its opposed valve seat under the influence of the spring bias to close the passageway 20a. The increased volume of carbon dioxide communicated to the control inlet portion 28c portion 28c through the open dip tube 28 also increases the rate of carbonation of the liquid during the interim of the dispensing operation.

With the valve passageway 20a now closed, the pump 12 is effective to open the check valve 40 and permit a flow of water from the supply source (not shown) through a flow path including the Venturi 28 and the receiving tank 14. When an amount of liquid corresponding to that removed through the dispensing head is restored to the system from the supply source, the liquid level in the chill tank 14 is restored to its original equilibrium level thereby closing the end of the dip tube and reopening the valve device 20. The system of the present invention is extremely sensitive to changes in liquid level within the chill tank so that a maximum supply of chilled liquid is maintained at all times. This prevents the refrigeration system for being overloaded due to a sudden inlet of a large amount of relatively warm water from the supply source. Also, the gas volume within the chill tank 14 remains substantially constant thereby eliminating the need for sophisticated valving or pressure regulating apparatus in order to sustain a constant pressure in the closed system.

An alternate embodiment of the berverage dispensing system of the invention is illustrated in FIG. 2. This embodiment is substantially identical to that of FIG. 1 excepting that the Venturi is now coupled on the outlet side of the chill tank rather than the inlet side as shown in FIG. 1. The correspondence between the various structural components is depicted by use of like numerals with the addition of primes. The closed loop flow path in the embodiment of FIG. 2 extends from the enclosed chill tank 14' through the exit conduit 18'. The conduit 18'continues on the outlet side of the Venturi 28' to circulate the fluid to the dispensers (not shown). Thus, the liquid is freshly carbonated just prior to its communication to the dispensers. It will be recalled that the rate of carbonation increases when liquid is being withdrawn from the system as the dip tube 38' is fully opened during this time. Thus, drinks of predetermined high carbonation are conveniently provided during intervals of continuous or semicontinuous dispensing of beverages.

The return conduit 19' from the dispensers (not shown) is coupled through the passageway of the valve 20' to the inlet side of the pump 12. The flow path is completed by the return conduit 23' coupled to the output side of the pump 12' and discharging into the enclosed chill tank 14'. Other than the positioning of the Venturi 28' in the closed loop flow path, the operation of the embodiment of the invention of FIG. 2 is identical to that of FIG. 1 and, accordingly, the operational description will not be repeated.

Figure 3:
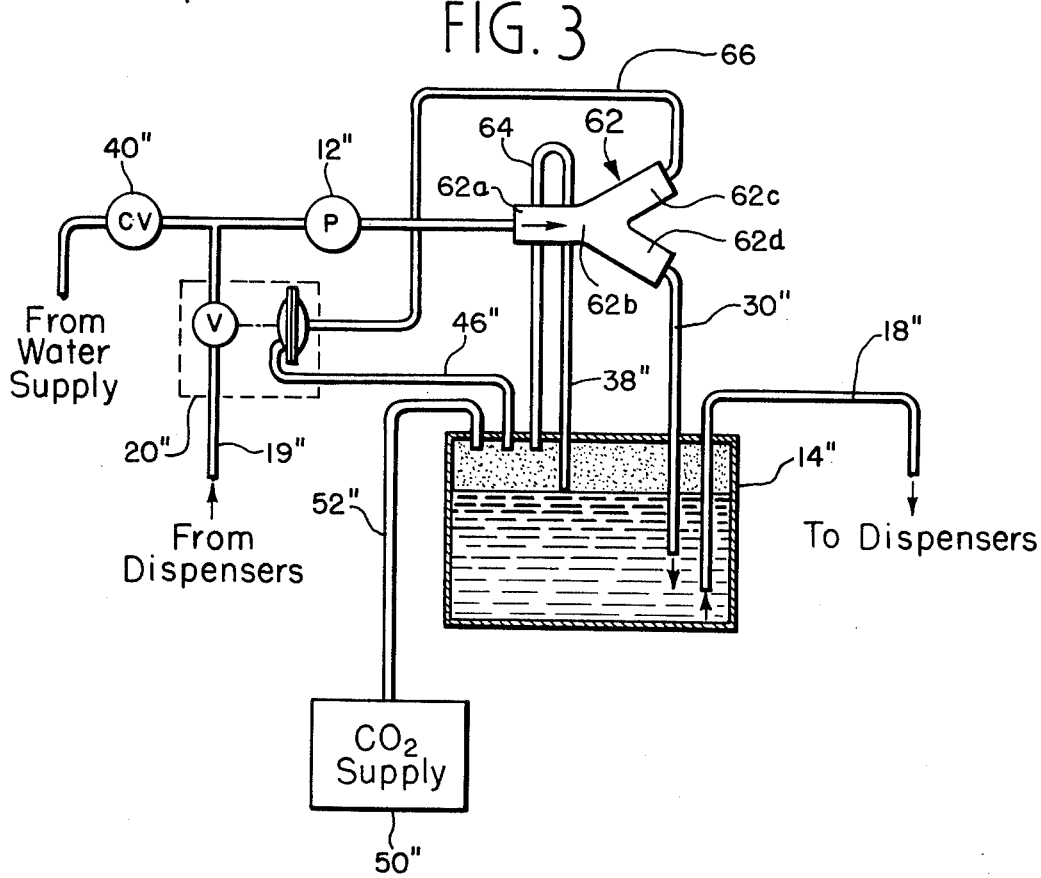
FIG. 3 is a partial schematic illustration of yet another alternate embodiment of a beverage dispensing system which utilizes a different type of fluid interaction device than that of the embodiments of FIGS. 1 and 2.

Referring now to FIG. 3, there is illustrated yet another embodiment of the invention wherein like numerals and double primes have been used to illustrate the correspondence with like elements of FIG. 1. The embodiment of FIG. 3 differs from that of FIG. 1 in the type of fluid interaction means utilized to effect the carbonation and flow control of the circulating liquid. Specifically, in this embodiment there is illustrated a conventional fluid amplifier 62 that employs the well-known Coanda wall-attachment effect to divert an inlet flow into one or the other of two selected outlet channels. Specifically, the fluid amplifier 62 includes an inlet portion 62a, and intermediate region 62b having a first control inlet portion coupled to the dip tube 38″ and a second inlet portion coupled a vent pipe 64 to the pressurized chill tank 14″. The amplifier 62 further includes an outlet portion that is bifurcated to define a pair of outlet ducts 62c and 62d.

In accordance with principles well understood in the art, closure of the fluid amplifier control inlet to which the dip tube 38″ is connected biases the inlet stream to the outlet duct 62d since a low pressure condition is developed on this side of the flowing stream relative to the pressure communicated through the open vent pipe 64 to the opposite side of the stream. The fluid amplifier 62 is constructed such that a preselected portion of the fluid flow is normally diverted into the outlet duct 62c upon opening of the dip tube 38″ and without regard to whether the vent pipe 64 is closed. The vent pipe 64 serves to maintain a reference pressure on the one side of the flowing stream as well as to carbonate the liquid as a result of entrainment of the $CO_2$ in the flowing stream.

The outlet duct 62c is connected by a conduit 66 to the differential pressure responsive valve device 20″. In the present embodiment, the reference pressure conduit 46″ and the outlet duct 62c are connected to opposite side of the valve diaphragm from their corresponding elements of FIG. 1 since, as will presently be explained, an increase, rather than a decrease, in pressure is utilized in the present embodiment to effect a closure of the valve 20″.

In briefly summarizing the operation of the embodiment of FIG. 3, it is again initially assumed that the system is in an equilibrium state such that the lower end of the dip tube 38″ is covered causing the full fluid flow to be diverted into the outlet duct 62d. Thus, the closed loop flow path extends from the outlet pipe 18″ for the tan 14″ past the shunt dispensers (not shown) and returns to the chill tank 14″ through the series combination of conduit 19″, the flow passageway of the valve 20″, the pump 12″, the inlet 62a and the outlet duct 62d of the fluid amplifier 62 and the conduit 30″.

Assuming now that one of the dispensers (not shown) is operated to tap liquid from the closed loop flow path, the level within the chill tank 14″ falls below the lower end of the dip tube 38″ thereby opening the associated control inlet of the fluid amplifier 62. Thus, the stream shifts away from the exit conduit 62d towards the conduit 62c. The portion of the liquid now entering the conduit 62c is coupled to one side of the diaphragm of the valve 20″ to increase the pressure thereon and therefore close the flow passageway of the valve. Pump 12″ now takes its prime from the supply source through the check valve 40″ to restore the liquid to its original level in the tank 14″.

Referring now to FIG. 4, there is generally designated by the reference numeral 70 a preferred form of the beverage dispensing system of the invention which system also embodies a unique liquid level or flow control arrangement as well as other features according to the present invention. The system 70 is similar in general respects to the earlier described embodiments and comprises a liquid pump 72 and a recirculation means to continuously provide a flow of a cold, freshly carbonated liquid from a chill tank 74 past a series of dispensing heads 76a-76c. In this regard, the chill tank 74 is, of course, sealed and coupled to a pressurized supply of carbon dioxide 75 in conventional fashion.

More particularly, the recirculation means includes a chill tank oultet conduit 78 which is connected in shunt to the dispensing heads 76a-76c by a conduit 79 of extended length running from the main system apparatus to the fountain or dispensing area. A return flow path from the dispensers to the chill tank includes a return conduit 80, a differential pressure responsive valve means 82, and a conduit 84 connecting to the input or suction side of the pump 72. The output of pump 72 is coupled by a short conduit section 86 to the upper end of a helically configured conduit means that is wrapped about the chill tank 74. For reasons presently to be explained in greater detail, the helical conduit section 88 is coaxially supported within a similarly configured refrigeration coil 90. The opposite ends of the refrigeration coil 90 are connected by respective conduit sections to a conventional refrigeration unit 92 which continuously circulates a fluid coolant in the annulus defined by the region intermediate the coaxially aligned conduits 88 and 90.

The downstream end of the helical flow coil 88 is connected by a conduit stub section 94 to a flow inlet channel 96a of a fluid interaction means 96. The device 96 in the present embodiment is a fluid amplifier belonging to a class of such devices known generally as turbulent amplifiers. As will presently be explained in greater detail, the amplifier 96 is of a novel construction and arrangement providing a digital, fluid pressure output signal in response to displacement of the liquid level within the chill tank 74 to or from a predetermined sensing level.

The inlet flow channel 96a of the amplifier 96 completes the return flow path to the chill tank and the fluid which is ejected from a nozzle-like orifice of the inlet 96a develops a pressure signal by impingement on a fluid amplifier outlet means 96b which, as shown, is separated from the inlet by a predetermined free space. The outlet 96b of the amplifier 96 communicates with a closed cavity of the differential pressure responsive valve 82 through a connecting conduit 98. In order to maintain the pressure drop across the amplifier inlet channel 96a approximately constant, a spring biased pressure relief or check valve 100 is connected between the conduit stub 94 and the pressurized environment of the chill tank 74 thereby to partially bypass the amplifier inlet channel whenever the liquid at the inlet exceeds the pressure within the enclosed chill tank 74 by more than a predetermined value, in this instance 5 psi.

Any liquid that is tapped from the recirculation system is replenished by an appropriate addition of liquid from a water supply source or the like (not shown) which communicates with the system through an inlet conduit 102. In order to assure that the beverages dispensed from the system are always of a uniformly cold temperature, there is provided a tempering tank 104 for precooling the supply liquid prior to its introduction into the recirculation flow path. More particularly, the cylindrical tank 104 is mounted concentrically of the chill tank 74 in sealed relation therewith such that the annular space intermediate the tanks 74, 104 provides a closed, pressurized reservoir of liquid that is precooled to a desired, nominal temperature by contact with the refrigeration coils 90. As shown, the water supply inlet conduit 102 is connected to the top of the tempering tank adjacent one side thereof while an outlet conduit 106, having its open end remotely positioned from the inlet conduit 102 to assure that only cooled liquid is drawn from the tank, is connected by a double check valve arrangement 108 to the recirculation flow path of the system at a point along the conduit section 84, i.e. intermediate the outlet of valve 82 and the inlet or suction of pump 72. The tempering tank outlet conduit 106 is also connected by a conduit section 109 to a spigot 110 to provide a cold, fresh water tap from the system in addition to the beverage dispensing taps 76a–76c. The precooled supply liquid is introduced into the recirculation means in a fashion similar to that of the earlier embodiments, namely, through blockage of the recirculation flow path by operation of the valve 82 thereby causing the pump 72 to draw its prime from the tempering tank 104 through the outlet conduit 106 and the normally closed check valve 108.

The valve structure 82 of the present embodiment is of a double diaphragm type comprising an intermediate casing section 112 and a pair of end casing sections 114 and 116 which cooperate with respective opposed faces of the intermediate section 112 to support a pair of diaphragm members 118 and 120 in sandwiched relation between the respective casing sections. The diaphragm members 118 and 120 are connected for coordinated movement by a plurality of vertical posts or stays 122. A helical spring 124, captivated between the lower casing section 116 and the underside of the diaphragm 120, biases the diaphragm structure toward the casing section 114. The diaphragm members 118, 120 divide the interior cavity of the valve structure into two pressure chambers and an intermediate liquid flow passage. A first pressure chamber is coupled by the conduit 98 to receive a fluid pressure signal from the outlet means 96b of the amplifier 96. A second pressure chamber is maintained at a reference pressure equal to the pressure within the closed chill tank 74, e.g. 80–85 psi, by a connecting conduit 126. The flow passageway defined in the central valve casing section intermediate the diaphragms 118, 120 provides a normally open flow path from the inlet conduit 80, through an outlet passage 128 to the conduit section 84.

The valve structure 82 is illustrated with the diaphragms 118, 120 in their normal or open position thereby permitting unimpeded flow between the inlet conduit 80 and the outlet conduit 84. The valve structure 82 is, however, responsive to a fluid pressure signal from the amplifier 96 to displace the diaphragm 118 against the influence of the reference pressure communicated to the outside of the diaphragm 120 and the spring 129 of the casing section 112 thereby to interrupt the recirculation flow path.

Figure 4A:
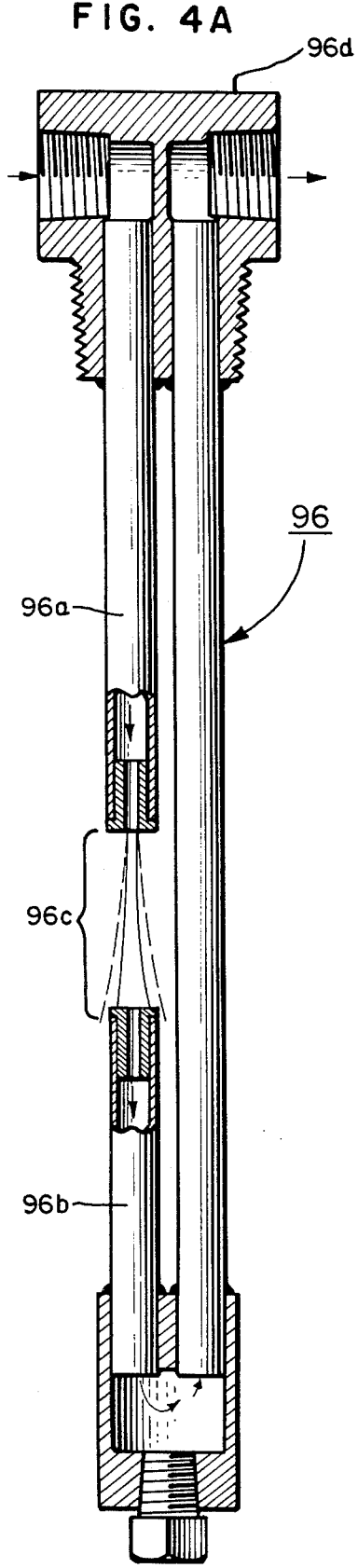
FIG. 4A is an enlarged view of the liquid level sensing device of the system of FIG. 4.

The fluid amplifier 96 for developing the aforesaid fluid pressure signal is illustrated in detail in FIG. 4A. The amplifier 96 includes serially aligned inlet, interaction and outlet zones respectively comprising the inlet flow channel 96a, the free space 96c separating the inlet and outlet flow channels and the outlet flow channel 96b. As seen in the drawing, the outlet flow channel 96b is formed with an intermediate bight portion to return the liquid to the common inlet-outlet header structure 96d of the amplifier and thence to the first chamber of the pressure responsive valve 82. The terminus of the inlet flow channel 96a is restricted in cross-section by a plug which defines a nozzle-like orifice for directing the exit flow across the free space of the interaction region 96c toward an axially aligned and structurally similar orifice plug of the outlet flow channel 96b. As denoted in the drawing by the conically diverging solid lines extending between the inlet and outlet flow orifices, the jet exiting from the inlet flow conduit 96a normally diverges in a conical fashion to a limited extent before impingement on the orifice plug of the outlet conduit 96b thereby resulting in a correspondingly reduced unit outlet pressure in the outlet flow channel 96b.

To the extent above described, the amplifier 96 is conventional; however, it has been found that certain surprising and highly desirable results are obtained on associating the amplifier 96 in a unique manner with a fluid reservoir. More particularly and in accordance with the present invention, the fluid amplifier 96 is positioned within a fluid reservoir or the like such that the axis of the fluid jet is tranverse to the surface of the liquid therein and further such that the terminus of the inlet flow channel 96a is located at a point immediately above a desired liquid sensing level within the reservoir. With this arrangement, it has been found that the liquid jet flowing between the inlet and outlet orifices substantially maintains the illustrated solid line conical configuration for any fluid level in the reservoir lying below the predetermined sensing level. In other words, the fluid pressure in the outlet conduit 96b is reasonably constant as the liquid level within the reservoir moves upwardly from a point lying vertically below the orifice plug of the outlet conduit 96b through the free space of the interaction region 96c toward the sensing level which, as previously stated, lies immediately below the orifice plug of the inlet flow conduit 96a.

On the other hand, it has been observed that when the liquid level rises to or above the sensing level, the focus area of the jet, i.e. the cross-sectional area of the jet at the point of impingement on the plug orifice of the outlet conduit 96b, increases markedly as denoted by the dotted lines in the drawing thereby causing a corresponding reduction in the pressure in the outlet flow conduit 96b. By way of example, in one constructed embodiment of the fluid amplifier 96 wherein the orifice apertures were three thirty-seconds of an inch in diameter, the interaction region spacing 96c 1 inch and the liquid water under a pressure of approximately 5 psi, it was observed that the liquid jet normally diverged to a focus area of three-sixteenths of an inch but that at the sensing level the focus area increased almost instantaneously to three-eighths of an inch in diameter. In terms of fluid signal pressure, the foregoing increase in focus area resulted in a relative pressure change on the order of 4 to 5 times. It was further observed that the sensing level occurred at approximately 0.010 inch below the end of the plug in the inlet conduit 96a.

It is currently believed that the above-described operational characteristics are related to the differing character of the fluid entrained by the amplifier jet when the reservoir level is respectively below and at the sensing level. Specifically, at all liquid levels below the sensing level, the jet emerging from the nozzle orifice of the amplfier inlet 96a entrains only the surrounding gas within the pressurized chill tank. On the other hand, when the liquid reaches the sensing level, the gas within the tank is substantially precluded access to the jet, hence, the surrounding liquid is drawn toward entrainment with the jet. As a consequence of its greater mass, the liquid moves more slowly than the gas and thereby materially reduces the circumferential pressure around the jet, causing the jet to conically diverge from its normal configuration in the manner denoted schematically by the dashed lines in the drawing.

Returning now to FIG. 4 and a discussion of other features of the system of the invention, a bypass conduit means 128 is coupled in shunt to that portion of the recirculation flow path extending from the chill tank to the dispensers and returning to the valve 82. Specifically, the conduit 128 is coupled between the outlet flow conduit 78 of the chill tank 74 and that portion of the return conduit 80 immediately preceding the inlet of the valve 82. In order to perform its desired function as will be explained, the conduit section 128 is provided with a flow restricting device 130 which in the present embodiment constitutes a check valve set to open at a predetermined pressure differential, in this instance 4 psi. The check valve 130 is normally closed during recirculation of the liquid within the system but opens to provide an ancillary flow path whenever the pressure loss across the conduit section that it shunts exceeds the aforesaid predetermined value. This predetermined pressure loss occurs in certain instances when liquid is being tapped from the system through one or more of the dispensers 76a–76c and is most likely to occur with frequency in those installations where the dispensers are at an extended distance from the primary system apparatus as, for example, 200–300 feet or more.

Absent the shunt conduit, prior art systems have encountered difficulties in returning adequate fluid to the pump to maintain proper operation and pump cavitation has occurred with resultant noise and reduction in pumping efficiency which in turn further accentuated the efficiency loss and noise. According to the present invention, the relief valve 130 is set to open at a pressure differential such that the optimum pumping efficiency of the pump 72 is maintained. Thus, even though a portion of the liquid is shunted past the dispensers, the maximum amount of fluid still flows past the dispenser heads according to the capability of the pump 72.

As a further advantage of the bypass conduit and relief valve arrangement 128, 130, it has been found that the carbonated liquid passing through the conduit 128 will in fact flow through the return conduit section 80 to the dispenser heads in instances of high pressure loss in the line. Accordingly, the capability of the system to provide fluid to the dispensers during periods of maximum demand is in fact increased by use of the described bypass arrangement, rather than decreased as might initially be expected. For example, assuming the conduit running to the dispensers to be on the order of three-eighth-inch in diameter, the bypass and return flow path actually increases the effective diameter to that of two parallel ⅜-inch conduits or the equivalent of one ½-inch conduit. Thus, installations wherein the dispensers are positioned at an extended distance from the primary system apparatus may still employ the more economical ⅜-inch conduit but provide an effective operation equivalent to a system having the more expensive ½-inch conduit. Furthermore, the bypass arrangement assures that adequate liquid is always communicated to the fluid amplifier 96 for its proper operation.

In accordance with another feature of the system as disclosed and claimed in a co-pending divisional application, the temperature of the circulating liquid is sensed and maintained at a predetermined constant temperature by use of a liquid pressure sensing arrangement including a pressure switch 132. More specifically, it is desired to maintain the carbonated liquid at a temperature just above its freezing point. To this end, the pressure switch 132 is connected to the upstream end of that portion of the recirculation flow conduit in which the flowing liquid is at the lowest temperature within the system. In the present instance, the pressure switch 132 is coupled to immediately precede the helically configured flow conduit 88 that is concentrically supported within the refrigeration coil 90. Any partial freezing of the liquid flowing in the conduit section 88 results in an increased pressure at the sensor of the switch 132. This sensed pressure increase is utilized to effect temperature control by connecting a signal developing portion of the switch 132 to the refrigeration unit 92, as is schematically denoted in the drawing by the arrow 134. The signal from the pressure switch 132 is adapted to effect a reduction in the cooling influence of the refrigeration unit 92 according to the sensed pressure increase. By way of illustration, the pressure switch 132 may be used to turn-off the refrigeration compressor (not shown) for the duration of the high pressure condition or, alternatively, to regulate the temperature of the coolant flowing in the refrigeration coil 90 without shutting down the compressor.

The aforesaid pressure sensing of temperature may be utilized either as the primary temperature control of liquid within the system or as a secondary, fail-safe temperature control in those instances where the conventional sensing apparatus fails to adequately respond to the temperature reduction. In addition to a failure situation, a conventional temperature control of the type employing a sensing bulb, capillary tube and bellows switch or the like has a rather long time concept of operation and, accordingly, with rapid changes in liquid temperature freezing may occur and damage the system before the condition is sensed and operation of the refrigeration unit 92 appropriately regulated. The pressure switch 132, on the other hand, immediately responds to the formation of slush ice or the like within the helical conduit 88 to effect a correspondingly prompt control of the refrigeration unit 92.

In summarizing the overall operation of the beverage dispensing system 70, it is initially assumed that the system is in an equilibrium condition with the liquid in the chill tank 74 being at the sensing level immediately below the terminus of the inlet conduit 96a of the fluid amplifier 96 thereby to communicate a pressure signal to the left side of the diaphragm 118 which is low relative to the reference and spring pressure on the opposed diaphragm 120. Accordingly, the interconnected diaphragm structure 118, 120 is biased to the left to maintain the valve passageway connecting the flow conduits 80, 84 in an open condition, as is illustrated in the drawing. Under the assumed conditions, the chilled, carbonated liquid is continually circulated by the pump 72 in the closed loop flow path previously described and denoted schematically by the arrows in the drawing. Specifically, the pump 72 draws the cold, carbonated liquid from the chill tank 74 through the outlet conduit 78 and the relatively long conduit 79, past the dispensers 76a–76c, through the return conduit 80, the valve 82 and the conduit 84 to the inlet side of the pump 72. The return path to the chill tank 74 is completed by the outlet conduit 86 from the pump 72, the helical chilling coil 88, the connecting conduit section 94 and the inlet 96a of the fluid amplifier 96. Since the chill tank 74 is filled to the sensing level, a fluid pressure signal is not applied to the valve 82 and the valve passageway remains open. With the passageway open, an insufficient differential pressure exists across the double check valve 108 to open the valve. Hence, no water is introduced into the circulating flow path from the tempering tank 104.

As previously noted, the dispensers 76a-76c may be positioned at a substantial distance, such as 200-300 feet or more, from the main system apparatus; the provision of the helical flow coil 88 concentrically mounted within the refrigeration coil 90 assures continuous and rapid rechilling of the liquid to its original temperature immediately prior to its return to the chill tank 74. The temperature of the chilled liquid in the helical coil 88 is maintained near its freezing point by the refrigeration unit 92, the operation of which is regulated by the pressure switch 132 in the manner previously described. The intimate association of the flow conduit 88 and the concentric refrigeration coil 90 provides a means for rapidly rechilling the returning liquid thereby substantially obviating the problems associated with effecting the chilling solely by means of the association of the refrigeration coils with the comparatively large volume chill tank 74.

The liquid entering the system from the supply or tempering tank 104 also passes through the helical cooling coil 88 prior to introduction into the chill tank 74. The prechilling of the liquid within the tempering tank 104 combined with the rapid cooling effected during flow through the conduit 88 assures that the dispensed beverages will always be of a uniform, cold temperature despite exceptionally high demands on the system. More particularly, the liquid entering the recirculation system from the tempering tank 104 follows a flow path from the outlet conduit 106 through the normally closed check valve 108, the pump 72, the conduit section 86, the helical cooling coil 88 and the inlet 96a of the amplifier 96 enroute to the chill tank 74.

The system is conditioned to effect introduction of the supply liquid into the chill tank 74 whenever the liquid level therein falls below the predetermined sensing level as occurs on removal of liquid through one or more of the dispensers 76a-76c. Under this circumstance, the liquid jet exiting from the fluid amplifier inlet conduit 96a impinges on the oulet 96b with a narrowed focus as previously discussed thereby resulting in a substantially increased fluid pressure signal to the pressure chamber adjacent the diaphragm 118 of the differential pressure responsive valve 82. The diaphragm structure 118-120 correspondingly shifts to the right to block the recirculation flow path, in turn causing the pump 72 to draw its prime from the tempering tank 104 through the conduit 106 and the check valve 108. An abrupt and secure closure of the diaphragm 118 against the annular valve seat 129 is assured by having the pump suction coupled to the valve so as to draw the diaphragm into engagement with the valve seat. As soon as sufficient liquid enters the system to restore the liquid level in the chill tank to the sensing level, the fluid pressure signal of the amplifier 96 is abruptly reduced and the recirculation flow path through the valve 82 is reopened by displacement of the diaphragm structure 118, 120 to the left in the drawing.

The check valve 130 connected in shunt to the relatively long dispenser conduit section opens from time to time in accordance with the demands of the dispensers 76a-76c for the reasons and in the manner previously described. The relief valve 100 likewise operates intermittently to maintain the pressure drop across the amplifier inlet 96a below a predetermined pressure valve.

Figure 5:
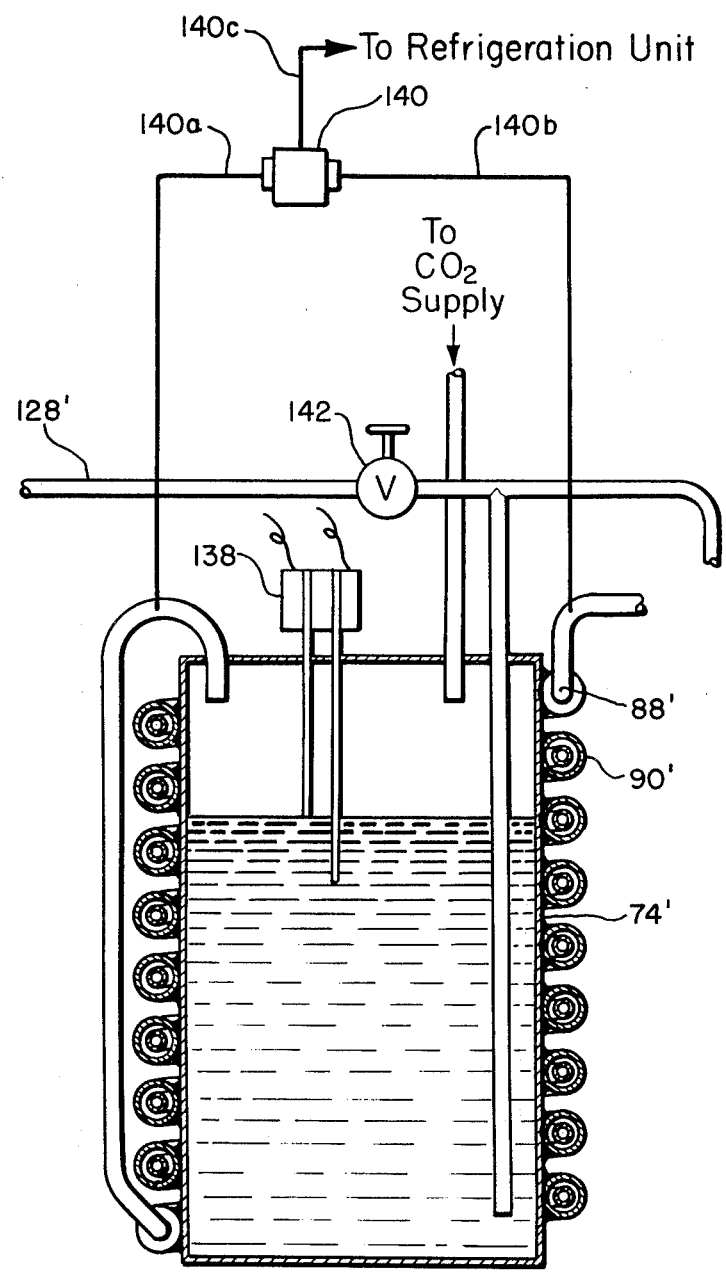
FIG. 5 is a partial schematic illustration of a beverage dispensing system having liquid temperature control apparatus and other features constructed according to the teachings of the present invention.

A further embodiment of a beverage dispensing system incorporating certain features of the invention is illustrated in FIG. 5; for simplicity and clarity of explanation, structural components of the system that may be identical to that previously described in connection with FIG. 4 are depicted by use of like reference numerals but with the addition of primes. The system of FIG. 5 unlike any of those previously described incorporates a conventional level sensor 138 of the dual level sensing variety. Specifically, the sensor 138 includes a pair of electrical probes projecting downwardly into the chill tank 74' with the probe elements terminating at respective vertically spaced levels therein. The sensor 138 operates in a conventional and well-known fashion to actuate a valve to admit liquid to the recirculation system whenever the liquid with the chill tank falls below the level of the lowermost electrode and closes the supply valve to institute recirculation of the liquid when the level within the tank is restored to a point in contact with the uppermost electrode. As pointed out earlier herein, such dual level systems have the disadvantage of causing substantial variations in the pressure within the system. In order to provide a liquid temperature control in accordance with sensed system pressure in such a circumstance, it is necessary to provide a control that is somewhat modified from that disclosed in the embodiment of FIG. 4. Specifically, a pressure switch 140 of FIG. 5 includes a pair of pressure sensing probes 140a and 140b that are connected to opposite ends of the helically configured flow coil 88' thereby to sense the pressure at the respective opposite ends of this flow coil. A terminal 140c of the pressure switch 140 provides an output that is proportional to the differential in pressure sensed by the elements 140a and 140b and this output is utilized to regulate the refrigeration unit in a manner previously described in connection with FIG. 4. Since the output 140c of the pressure switch 140 is related to a pressure differential as opposed to an absolute pressure, variations in system pressure are not detected but only pressure increases due to transition of the fluid within the helical coil 88' from a liquid to a partially frozen or slush ice condition.

The embodiment of FIG. 5 also illustrates a manually actuable valve 142 which may be connected in the bypass or shunt conduit 128' in place of the spring-loaded check valve 130 of FIG. 4. Although not preferred, the valve 142 or a simple orifice plug will operate in a manner generally similar to that previously described in connection with the check valve 130.

Although the various flow control apparatus of the present invention has been illustrated and described only in the context of beverage dispensing systems, it will be recognized by those skilled in the art that it has far broader applications. For example, the flow control apparatus may be utilized to provide an antistatic valve for dispensing of volatile liquid or the like. In this regard, it is known that in refueling of aircraft, etc., an extremely dangerous static electrical charge is likely to accumulate despite atttempted precautions unless the fuel tanks are first filled to a minimum critical level at a relatively slow flow rate after which the flow rate may be sharply increased with complete safety.

One suitable construction of such a valve according to the present invention involves the series connection of a Venturi or the like and the flow passage of a differential pressure valve between a fuel supply source and the receiving or fuel tank. A dip tube is positioned to extend into the tank with its lower end terminating at a level corresponding to the critical fluid depth at which the rate of refueling may safely be increased to the high flow rate. The opposite end of the dip tube is coupled in parallel to the control orifice of the Venturi and to one side of the diaphragm of the differential pressure valve; the other side of the diaphragm may be vented to the atmosphere. As long as the lower end of the dip tube remains uncovered, the flow passageway of the differential pressure valve is restricted to permit only a relatively low flow rate into the receiving tank, such as three feet per second. When the liquid level in the tank rises to cover the lower end of the dip tube, a sharp pressure reduction occurs in the dip tube as a consequence of the suction of the Venturi. This reduced pressure results in a displacement of the diaphragm of the differential pressure valve to fully open the valve passageway and permit the inlet of fuel at a high rate, such as 27 feet per second. Similar arrangements may be made employing the other embodiments of the flow control apparatus disclosed herein, all as will now be understood by those skilled in the art.

While particular embodiments of the invention have been shown and described, it is apparent that various changes and modifications may be made, and it is therefore intended in the following claims to cover all such modifications and changes as may fall within the true spirit and scope of this invention.

What is claimed is:

1. In a beverage dispensing system of the type including a liquid supply source, a liquid chilling tank, beverage dispensing means and recirculation means defining a closed loop flow path including a liquid pump, said chilling tank and said dispensing means for continuously circulating a chilled liquid to said dispensing means and further including liquid level sensing means and valve means for introducing liquid from said supply source into said chilling tank when the liquid level therein recedes below a predetermined level, the improvement comprising:

conduit means included in said recirculation flow path and extending from said chill tank for a predetermined long distance to said dispensing means and returning to the inlet side of said valve means; and bypass means including a flow conduit of a substantially shorter length than said conduit means coupled between a portion of said conduit means adjacent said chill tank and the inlet side of said valve means for providing an adequate supply of liquid to said liquid pump to preclude pump cavitation and for providing an ancillary flow path to said dispensing means by flow through said flow conduit and said conduit means.

2. The combination of claim 1 in which said bypass means comprises a manually adjustable valve.

3. The combination of claim 1 in which said bypass means comprises a spring biased relief valve.

4. In a liquid supply system of the type including a liquid supply source, a reservoir dispensing means and recirculation means defining a closed loop flow path including a liquid pump, said reservoir and said dispensing means for continuously circulating a liquid to said dispensing means and further including liquid level sensing means and valve means for introducing liquid from said supply source into said reservoir when the liquid level therein recedes below a predetermined level, the improvement comprising:

conduit means included in said recirculation flow path and extending from said reservoir for a predetermined long distance to said dispensing means and returning to the inlet side of said valve means; and bypass means including a flow conduit of a substantially shorter length than said conduit means coupled between a portion of said conduit means adjacent said reservoir and the inlet side of said valve means for providing an adequate supply of liquid to said liquid pump to preclude pump cavitation and for providing an ancillary flow path to said dispensing means by flow through said flow conduit and said conduit means.

5. In a beverage dispensing system of the type including a liquid supply source, a liquid chilling tank, beverage dispensing means and recirculation means defining a closed loop flow path including a liquid pump, said chilling tank and said dispensing means for continually circulating a chilled liquid to said dispensing means, the combination comprising:

refrigeration means including a refrigeration coil helically wound about said chill tank;

conduit means coupled in the return flow portion of said recirculation flow path between said dispenser means and said chill tank and comprising a helical coil centrally supported within said helical refrigeration coil for rapidly recooling the circulating liquid prior to reintroduction into said chill tank;

and tempering tank means surrounding said chill tank and defining therewith an annular liquid reservoir for precooling liquid by contact with said helical refrigeration coil, said tempering tank means having an inlet coupled to said supply source and an outlet coupled to said conduit means for passing said precooled liquid through said helical coil to effect a rapid, additional cooling of said precooled liquid prior to introduction of said liquid into said chill tank.

* * * * *